No. 846,241. PATENTED MAR. 5, 1907.
T. M. K. OVERLAND.
GRADE METER.
APPLICATION FILED JULY 25, 1906.
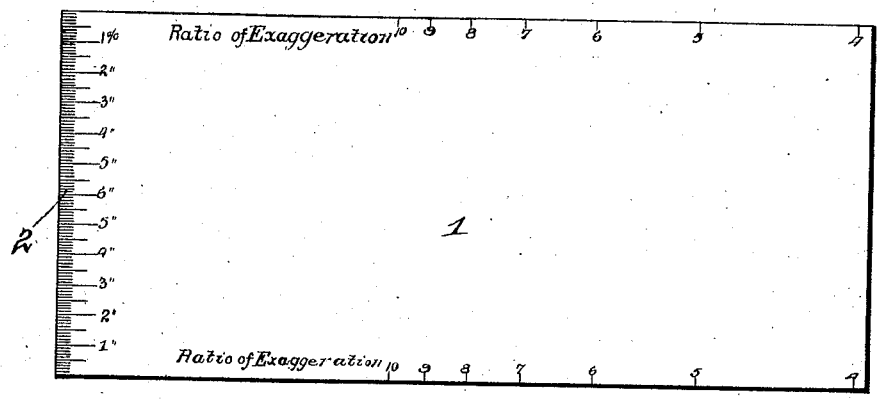
Witnesses
Frank Hough
P. Gallagher
Inventor
T.M.K. Overland
By Victor J. Evans
Attorney

UNITED STATES PATENT OFFICE.

THOMAS M. K. OVERLAND, OF NEW YORK, N. Y.

GRADE-METER.

No. 846,241.     Specification of Letters Patent.     Patented March 5, 1907.

Application filed July 25, 1906. Serial No. 327,734.

*To all whom it may concern:*

Be it known that I, THOMAS M. K. OVERLAND, a subject of the King of Norway, residing at New York, in the county of New York and State of New York, have invented new and useful Improvements in Grade-Meters, of which the following is a specification.

The invention relates generally to an improvement in drafting instruments, and particularly to an instrument designed for measuring, checking, and plotting grade angles on profiles in different determinate exaggerated scales, as required by railroad, highway, irrigation, canal, and other engineers, the instrument performing, in effect, the service on the profile similar to the service of the protractor on the map.

The main object of the invention is the production of a plotting instrument constructed and arranged to enable the engineer to plot a grade angle of a desired per cent. grade exaggerated a determinate number of times, whereby to dispense with the mathematical calculation ordinarily incident to determining the grade angle.

The invention will be described in detail in the following specification, reference being had particularly to the accompanying drawing, in which the figure represents a plan of the plotting instrument.

In the drawings the instrument is shown as a rectangular sheet of material 1, which may be constructed of any desired material and is preferably of a size convenient for drafting purposes.

One edge of the instrument is suitably scaled at 2 to indicate the per cent. of grade, being in the form illustrated divided by short horizontally-disposed lines equally spaced, every tenth line being a major division. The major lines are marked in consecutive order, as 1, 2, 3, 4, 5, and 6, the latter being at a point approximately midway the length of the side scaled. Above the central point the major lines decrease in relative indicating numerals, as shown. This arrangement provides simply for the use of the plotter in reverse position. Each of the minor lines being one-tenth of the major spaces indicate one-tenth of one per cent.

The edges of the instrument at right angles to the scaled edge described are also marked to indicate the exaggeration ratio. In the form shown the latter edge is marked with scale-marks which are numbered successively 4, 5, 6, 7, 8, 9, and 10. The scale-marks indicating the ratio of exaggeration are spaced apart a distance previously determined by proper calculation to give the particular extent of exaggeration and are therefore numbered in consecutive toward the grade-per-cent. scaled edge hereinabove referred to, the scale-mark indicating the ratio of exaggeration, as 10, being closer to the grade-per-cent. scaled edge than are the other ratio-of-exaggeration scale-marks.

In using the instrument and given a particular point on the profile-drawing of the road-bed with the grade of, say, four per cent. to be plotted with the ratio of exaggeration as 5 the ratio-of-exaggeration scale-mark 5 is caused to register with the point from which the grade is to be plotted, the edge of the instrument bearing the ratio-of-exaggeration scale being disposed absolutely parallel with the base-line of the plot. The per cent. of grade to be determined being four per cent., the engineer will mark the paper at the point intersected by the major scale-line 4 on the grade-per-cent. scale. There is thus provided two points—namely, the initial point from which the grade is to be plotted and the point determined by the intersection of the major line desired on the grade-per-cent. scale. A line drawn through these two points and continued for the length desired is the grade-line, the per cent. of grade being four and the ratio of exaggeration being five.

It is of course obvious that any per cent. of grade at any ratio of exaggeration may be equally as readily determined by the use of the proper scale-marks, it being understood that the instrument of the present invention is intended to be so scaled as to provide for any usual or desired plotting along the lines indicated.

In addition to the use of the instrument for plotting grades at a given per cent. and at a given ratio of exaggeration the instrument is equally serviceable for the use of the draftsman in arriving at an absolute figuring of the grade shown on any particular plot, as the use of the instrument for the latter purpose will serve by an obvious use for checking and indicating the grade per cent. and the ratio of exaggeration for the particular angle of grade shown on the plot.

The use of the instrument will therefore at once dispense with the mathematical calculations necessary in plotting a line of grade at a particular per cent. with a given ratio of exaggeration, thereby simplifying the work of the engineer in this particular, while at the same time avoiding possibility of error.

The form of the invention shown is the preferred form, and it is to be particularly understood that I do not limit myself thereto, the gist of the present invention residing in a plotter having scaled sides set at a relative angle, one scale to indicate grade per cent. and the other scale to indicate the ratio of exaggeration. Therefore I consider as within the spirit of the present invention all variations and modifications of the form of instrument herein shown which will legally fall within the scope of the appended claims.

Having described my invention, what I claim is—

1. A profile-protractor marked to indicate a per-cent. scale and a ratio-of-exaggeration scale, the respective scales being so relatively disposed that a line drawn from a determinate point on the ratio-of-exaggeration scale through a determinate point on the per-cent. scale will indicate a line of the determinate per cent. incline exaggerated the number of times indicated by the determinate point of the ratio-of-exaggeration scale.

2. A profile-protractor having a per-cent. scale and a ratio-of-exaggeration scale, the respective scales being so relatively disposed that their scale-marks provide indicating-points for a line of a determinate per cent. incline at a determinate ratio of exaggeration, the respective scales being disposed at a right angle to each other with the per-cent. scale indicating numerals consecutively increasing from the point of juncture of the scales, and the ratio-of-exaggeration scale indicating numerals consecutively decreasing therefrom.

3. A profile-protractor having a per-cent. scale and a ratio-of-exaggeration scale, the respective scales being so relatively disposed that their scale-marks provide indicating-points for a line of a determinate per cent. incline at a determinate ratio of exaggeration, the respective scales being disposed at right angles to each other with the per-cent. scale indicating numerals consecutively increasing from the point of juncture of the scales, and the ratio-of-exaggeration scale indicating numerals consecutively decreasing therefrom, the per-cent. scale indicating lines being equally spaced throughout the length of the scale and the ratio-of-exaggeration scale indicating lines being respectively separated by gradually-increasing spaces.

In testimony whereof I affix my signature in presence of two witnesses.

THOMAS M. K. OVERLAND.

Witnesses:
JAMES F. DUHAMEL,
HARRY HEBIG.